(12) United States Patent
Destarac et al.

(10) Patent No.: US 6,506,837 B2
(45) Date of Patent: *Jan. 14, 2003

(54) GELLED AQUEOUS COMPOSITION COMPRISING A BLOCK COPOLYMER CONTAINING AT LEAST ONE WATER-SOLUBLE BLOCK AND ONE HYDROPHOBIC BLOCK

(75) Inventors: Mathias Destarac, Paris (FR); Mathieu Joanicot, Lawrenceville, NJ (US); Roland Reeb, Gressy (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/788,941

(22) Filed: Feb. 20, 2001

(65) Prior Publication Data

US 2001/0034428 A1 Oct. 25, 2001

Related U.S. Application Data

(63) Continuation-in-part of application No. 09/387,487, filed on Sep. 1, 1999, now abandoned.

(51) Int. Cl.$^7$ .................. C08F 295/00; C08F 293/00
(52) U.S. Cl. .................. 525/71; 525/293; 525/294; 525/296; 525/299
(58) Field of Search .................. 525/71, 299, 293, 525/294, 296; 524/505, 824

(56) References Cited

U.S. PATENT DOCUMENTS

| 4,835,211 A | 5/1989 | Noda | 526/312 |
| 6,111,025 A | * 8/2000 | Visger et al. | 525/244 |

FOREIGN PATENT DOCUMENTS

| WO | WO 01/16187 | 3/2001 | C08F/8/12 |

* cited by examiner

Primary Examiner—Nathan M. Nutter
Assistant Examiner—Olga Asinovsky

(57) ABSTRACT

The invention relates to a gelling aqueous composition comprising block copolymers containing at least one water-soluble block and at least one block predominantly hydrophobic in nature, and forming a viscoelastic gel.

22 Claims, No Drawings

GELLED AQUEOUS COMPOSITION COMPRISING A BLOCK COPOLYMER CONTAINING AT LEAST ONE WATER-SOLUBLE BLOCK AND ONE HYDROPHOBIC BLOCK

This application is a continuation in-part application of Ser. No. 09/387,487, filed on Sep. 01, 1999 now abandoned.

The present invention relates to a gelled aqueous composition comprising a block copolymer containing at least one water-soluble block and one hydrophobic block.

Amphiphilic molecules are molecules having different water-solubility regions which give them special properties. A known example of an amphiphilic molecule is that of surfactants which may have a hydrophilic and a hydrophobic region.

Because of their amphiphilic character, these molecules come together and organize themselves in solution in water to form micelles. These micelles may be of various morphologies, such as spherical micelles or anisotropic micelles (for example lamellar or vermicular micelles). Spherical micelles are the most common as they are the most accessible.

These micelles are in equilibrium, which means that dilution or addition of a solvent or of a cosurfactant to the medium containing these micelles results in a variation in the size of the micelles or in their morphology.

One objective of the present invention is to provide amphiphilic block copolymers of hydrophobic/hydrophilic structure which can form a gel when they are in water.

Another objective is to be able to obtain easily preparable aqueous gels whose elastic modulus can be adjusted.

To achieve the above objectives, the purpose of the invention is the use of a block copolymer containing at least one block water-soluble in nature and at least one block predominantly hydrophobic in nature, which copolymer is in the form of micelles when it is in water.

This block copolymer forms a viscoelastic gel when it is in solution in water.

This block copolymer contains at least one block predominantly hydrophobic in nature and at least one water-soluble block, the predominantly hydrophobic block having hydrophilic units preferably in an amount of less than 33% by weight with respect of the total weight of the units of said predominantly hydrophobic block. This amount may be equal to 0 but is preferably at least 1% by weight and less than 25% by weight, even more preferably between 2 and 15%, with respect to the total weight of the units of said predominantly hydrophobic block.

This block copolymer contains at least one block predominantly hydrophobic in nature and at least one water-soluble block, the water-soluble block having hydrophobic units in an amount which may be small, about 1% of the total weight of the units of said water-soluble block. The maximum amount of hydrophobic units depends on the nature of the units and is in most cases less than 70% by weight and at least 1% by weight, and even more preferably less than 50% by weight and at least 10%, with respect to the total weight of the units of said water-soluble block.

The invention also relates to a process for preparing these block copolymers by so-called living or controlled polymerization.

The invention also relates to a process for controlling the hydrophilic/hydrophobic balance of amphiphilic block copolymers having at least one block coming from the polymerization of hydrophilic monomers and at least one block coming from the polymerization of hydrophobic monomers, in which process:

hydrophilic units are introduced into the block coming from the polymerization of hydrophobic monomers, and/or hydrophobic units are introduced into the block coming from the polymerization of hydrophilic monomers.

Finally, the invention relates to the use of these block copolymers as gelling agents or as thickeners for aqueous medium.

The invention firstly therefore relates to a block copolymer containing at least one block water-soluble in nature and at least one block predominantly hydrophobic in nature. According to a first embodiment, the copolymer contains only a single hydrophobic block and a single water-soluble block. According to another embodiment, the copolymer contains a water-soluble block having a hydrophobic group at each end or vice-versa.

In the description which follows, the expression "block water-soluble in nature" should be understood to mean a polymer block containing a number of hydrophilic groups sufficient to obtain a water soluble block well dissolved in water. Solubility in water of the water soluble block means a block copolymer containing such a water-soluble block, when mixed with water, gives a translucent monophasic system. Usually such a translucent monophasic system is obtained from a water soluble block comprising at least 30%, preferably at least 50% by weight of hydrophilic units with respect to the totality of units of the water-soluble block. The block water-soluble in nature is therefore soluble in water. The term "unit" should be understood to mean that part of the block corresponding to a monomeric unit.

Likewise, the expression "block predominantly hydrophobic in nature" should be understood to mean a polymer block preferably containing at least 67% by weight hydrophobic units with respect to the totality of units. The block predominantly hydrophobic in nature is not soluble in water. This block copolymer containing at least one block water-soluble in nature and at least one block predominantly hydrophobic in nature forms a viscoelastic gel when it is in solution in water.

The term "viscoelastic gel" should be understood to mean a liquid medium for which the viscous modulus G" and the elastic modulus G' are such that G'>G". This gel behaviour is manifested by a flow threshold and even, in some cases, by a shear-thickening effect (an increase in the viscosity with flow). This gel effect is obtained when the polymer concentration exceeds a certain threshold called the critical gelling concentration.

The block copolymers according to the present invention have the advantage of making the aqueous media viscoelastic when they are used in only a small amount with respect to the aqueous medium. The copolymer is preferably used at a concentration higher than 0.1% by weight and even more preferably at a concentration from 1 to 10% by weight.

The properties of the copolymers according to the present invention may be obtained by selecting the nature of the soluble blocks and the nature of the predominantly hydrophobic blocks, at least the hydrophilic block having to contain hydrophobic groups in an appropriate amount.

According to one embodiment of the invention, the weight ratio of the block water-soluble in nature to the completely hydrophobic block is between 95/5 and 20/80, even more preferably between 90/10 and 40/60.

According to a first version of the preparation, the blocks water-soluble in nature and the blocks predominantly hydrophobic in nature of the above copolymers may come from the copolymerization of hydrophilic and hydrophobic monomers. The amounts of hydrophilic and hydrophobic units in each of the said blocks can then be controlled by the respective contents of hydrophilic monomers and hydrophobic monomers during the polymerization of the blocks.

Thus, the blocks predominantly hydrophobic in nature may come from the copolymerization of hydrophobic monomers and of hydrophilic monomers, the hydrophilic monomers being present in an amount of less than 33% by weight, preferably at least 1% by weight, even more preferably between 2 and 15%, with respect to the total weight of the units of the hydrophobic block.

In addition, the blocks water-soluble in nature may come from the copolymerization of hydrophilic monomers and of hydrophobic monomers, the hydrophobic monomers being present in an amount of less than 70% by weight, preferably at least 1% by weight, even more preferably between 50 and 25%, with respect to the total weight of the units of the water-soluble block.

According to a second version of the preparation, the blocks water-soluble in nature may come:
  from the polymerization of monomers that may be rendered hydrophilic by hydrolysis and optionally of non-hydrolysable hydrophobic monomers and/or hydrophilic monomers, and then
  from the hydrolysis of the polymer obtained.
During the hydrolysis, the units corresponding to the hydrolysable monomers are hydrolysed into hydrophilic units.

The amounts of hydrophilic and hydrophobic units in each of the said blocks are then controlled by the amount of each type of monomer and by the degree of hydrolysis.

According to this second version, various methods of implementation may be envisaged.

According to a first method of implementation, the blocks may be obtained by:
  homopolymerization of hydrophobic monomers that can be rendered hydrophilic by hydrolysis and
  partial hydrolysis of the homopolymer obtained to a degree such that what is obtained is:
    either, in the case of the blocks predominantly hydrophobic in nature, an amount of hydrophilic units of less than 33% by weight, preferably at least 1% by weight, even more preferably between 2 and 15%, with respect to the total weight of the units of the hydrophobic block.
    or, in the case of the blocks water-soluble in nature, an amount of hydrophobic units of less than 70% by weight, preferably at least 1% by weight, even more preferably between 25 and 50%, with respect to the total weight of the units of the water-soluble block.

According to a second method of implementation, the blocks may be obtained by:
  copolymerization of hydrophobic monomers that can be rendered hydrophilic by hydrolysis and of hydrophobic monomers that cannot be rendered hydrophilic by hydrolysis and then
  complete or partial hydrolysis of the polymer obtained.

According to this second method of implementation, the amount of hydrophilic and hydrophobic units may depend on two criteria, namely the content of the various types of monomers and the degree of hydrolysis.

If there is complete hydrolysis, it is sufficient to vary the content of the monomers and thus:
  the blocks predominantly hydrophobic in nature can come:
    from the polymerization of a mixture of hydrophobic monomers that can be rendered hydrophilic by hydrolysis and of hydrophobic monomers that cannot be rendered hydrophilic by hydrolysis, the hydrophobic monomers that can be rendered hydrophilic by hydrolysis being present in an amount of less than 33% by weight, preferably at least 1% by weight, even more preferably between 2 and 15%, with respect to the total weight of the units of the hydrophobic block, and then
  from the complete hydrolysis of the polymer obtained;
  the blocks water-soluble in nature may come:
    from the polymerization of a mixture of hydrophobic monomers that can be rendered hydrophilic by hydrolysis and of hydrophobic monomers that cannot be rendered hydrophilic by hydrolysis, the hydrophobic monomers that cannot be rendered hydrophilic by hydrolysis being present in an amount of less than 70% by weight, preferably at least 1% by weight, even more preferably between 50 and 25%, with respect to the total weight of the units of the water-soluble block, and then
    from the complete hydrolysis of the polymer obtained.

If there is partial hydrolysis, the monomer content and the degree of hydrolysis may be varied at the same time.

According to a third method of implementation, the blocks may be obtained by:
  copolymerization of hydrophobic monomers that can be rendered hydrophilic by hydrolysis and of hydrophilic monomers and then
  partial hydrolysis of the polymer obtained to a degree such that what is obtained is:
    either, in the case of the blocks predominantly hydrophobic in nature, an amount of hydrophilic units of less than 33% by weight, preferably at least 1% by weight, even more preferably between 2 and 15%, with respect to the total weight of the units of the hydrophobic block.
    or, in the case of the blocks water-soluble in nature, an amount of hydrophobic units of less than 70% by weight, preferably at least 1% by weight, even more preferably between 50 and 25%, with respect to the total weight of the units of the water-soluble block.

In general, the hydrophobic monomers may be chosen from:
  vinylaromatic monomers, such as styrene,
  dienes, such as butadiene,
  alkyl acrylates and methacrylates the alkyl group of which contains from 1 to 10 carbon atoms, such as methyl, ethyl, n-butyl, 2-ethylhexyl, tert-butyl, isobornyl, phenyl and benzyl acrylates and methacrylates.
Preferably, it is styrene.

The hydrophilic monomers may be chosen from:
  ethylenically unsaturated carboxylic acids such as acrylic and methacrylic acids;
  neutral hydrophilic monomers such as acrylamide and its derivatives (N-methylacrylamide, N-isopropylacrylamide), methacrylamide, polyethylene glycol methacrylate and polyethylene glycol acrylate;
  anionic hydrophilic monomers: sodium 2-acrylamido-2-methylpropanesulphonate (SAMPS), sodium styrenesulphonate and sodium vinylsulphonate.

The monomers that can be rendered hydrophilic by hydrolysis may be chosen from:
  acrylic and methacrylic esters hydrolysable in acid, such as methyl acrylate, ethyl acrylate, hydroxyethyl methacrylate, hydroxyethyl acrylate and tert-butyl acrylate;

vinyl acetate hydrolysable into vinyl alcohol units;
quaternized 2-dimethylaminoethyl methacrylate and acrylate (quatdamma and quatdama);
acrylamide and (meth)acrylamide.

Preferably, the block copolymers according to the invention are diblock copolymers. However, they may also be triblock, or even multiblock copolymers. If the copolymer comprises three blocks, it is preferable to have a block water-soluble in nature flanked by two blocks predominantly hydrophobic in nature.

According to a particular embodiment of the invention, the copolymer is a diblock copolymer comprising a block water-soluble in nature and a block predominantly hydrophobic in nature, in which:
the block water-soluble in nature contains acrylic acid (AA) units and ethyl acrylate (EtA) units and
the block predominantly hydrophobic in nature contains styrene (St) units and methacrylic acid (MAA) and/or hydroxyethyl methacrylate (HEMA) units.

Preferably, according to this embodiment, the block water-soluble in nature comes:
from the polymerization of methacrylic acid (MAA) and of ethyl acrylate (EtA) in an EtA/MAA weight ratio from 90/10 to 99/1, and then
from the hydrolysis of the polymer obtained to a degree of at least 50 mol% up to 95 mol%.

Preferably, the block predominantly hydrophobic in nature comes from the polymerization of a monomer mixture comprising at least 80% by weight styrene.

Generally, the block copolymers according to the invention have a molecular mass of at most 100,000 g/mol, preferably at least 1000 g/mol.

In general, the above block copolymers can be obtained by any so-called living or controlled polymerization process such as, for example:
radical polymerization controlled by xanthates according to the teaching of Application WO 98/58974,
radical polymerization controlled by dithioesters according to the teaching of Application WO 97/01478,
polymerization using nitroxide precursors according to the teaching of Application WO 99/03894,
radical polymerization controlled by dithiocarbamates according to the teaching of Application WO 99/31144,
atom transfer radical polymerization (ATRP) according to the teaching of Application WO 96/30421,
radical polymerization controlled by iniferters according to the teaching of Otu et al., Makromol. Chem. Rapid. Commun., 3, 127 (1982),
radical polymerization controlled by degenerative iodine transfer according to the teaching of Tatemoto et al., Jap. 50, 127, 991 (1975), Daikin Kogyo Co Ltd., Japan and Matyjaszewski et al., Macromolecules, 28, 2093 (1995),
group transfer polymerization according to the teaching of O. W. Webster "Group Transfer Polymerization", pp. 580–588 in "Encyclopedia of Polymer Science and Engineering", vol. 7 and H. F. Mark, N. M. Bikales, C. G. Overberger and G. Menges, Publ., Wiley Interscience, New York, 1987,
radical polymerization controlled by tetraphenylethane derivatives (D. Braun et al., Macromol.Symp. 111,63 (1996)), and
radical polymerization controlled by organocobalt complexes (Wayland et al., J.Am.Chem.Soc. 116,7973 (1994)).

The preferred polymerization is living radical polymerization using xanthates.

The invention therefore furthermore relates to a process for preparing these block copolymers. This process consists in:
1• the following being brought into contact with one another:
at least one ethylenically unsaturated monomer,
at least one source of free radicals and
at least one compound of formula (I):

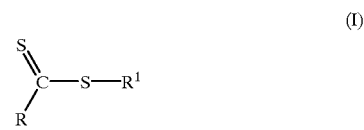

in which:
R represents an $R^2O—$, $R^2R'^2N—$ or $R^3—$ group, where: $R^2$ and $R'^2$, which are identical or different, represent (i) an alkyl, acyl, aryl, alkene or alkyne group or (ii) a saturated or unsaturated, possibly aromatic, carbocycle or (iii) a saturated or unsaturated heterocycle, these groups and rings (i), (ii) and (iii) possibly being substituted,
$R^3$ represents H, Cl, an alkyl, aryl, alkene or alkyne group, a saturated or unsaturated, optionally substituted (hetero) cycle, an alkylthio, alkoxycarbonyl, aryloxycarbonyl, carboxy, acyloxy, carbamoyl, cyano, dialkylphosphonato, diarylphosphonato, dialkylphosphinato or diarylphosphinato group, or a polymer chain,
$R^1$ represents (i) an optionally substituted alkyl, acyl, aryl, alkene or alkyne group or (ii) an optionally substituted or aromatic, saturated or unsaturated, carbocycle or (iii) an optionally substituted, saturated or unsaturated, heterocycle, or a polymer chain;
2• the above contacting operation being repeated at least once, using:
monomers differing from those in the previous operation, and
instead of the precursor compound of formula (I), the polymer coming from the previous operation; and
3• optionally, the copolymer obtained being hydrolysed.

The $R^1$, $R^2$, $R'^2$ and $R^3$ groups may be substituted with alkyl groups, substituted phenyls, substituted aromatic groups or one of the following groups: oxo, alkoxycarbonyl or aryloxycarbonyl (—COOR), carboxy (—COOH), acyloxy (—O$_2$CR), carbamoyl (—CONR$_2$), cyano (—CN), alkylcarbonyl, alkylarylcarbonyl, arylcarbonyl, arylalkylcarbonyl, isocyanate, phthalimido, maleïmido, succinimido, amidino, guanidimo, hydroxyl (—OH), amino (—NR$_2$), halogen, allyl, epoxy, alkoxy (—OR), S-alkyl, S-aryl, silyl, groups having a hydrophilic or ionic character, such as alkali metal salts of carboxylic acids, alkali metal salts of sulphonic acid, polyoxy alkylene (POE, POP) chains, and cationic substituents (quaternary ammonium salts), R representing an alkyl or aryl group.

Preferably, the compound of formula (I) is a dithiocarbonate chosen from compounds of the following formulae (IA), (IB) and (IC):

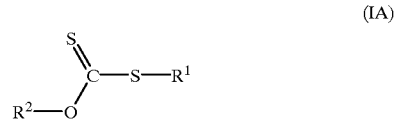

-continued

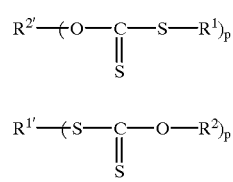

in which:

$R^2$ and $R^{2'}$ represent (i) an alkyl, acyl, aryl, alkene or alkyne group, or (ii) an optionally aromatic, saturated or unsaturated, carbocycle or (iii) a saturated or unsaturated heterocycle, these groups and rings (i), (ii) and (iii) possibly being substituted;

$R^1$ and $R^{1'}$ represent (i) an optionally substituted alkyl, acyl, aryl, alkene or alkyne group or (ii) an optionally substituted or aromatic, saturated or unsaturated, carbocycle or (iii) an optionally substituted, saturated or unsaturated, heterocycle, or a polymer chain;

p is between 2 and 10.

During step 1, a first block of the copolymer is synthesized so as to become water soluble or hydrophobic in nature depending on the nature and the amount of monomers used. During step 2, the other block of the polymer is synthesized.

The ethylenically unsaturated monomers will be chosen from the hydrophilic, hydrophobic and hydrolysable monomers defined above, in proportions suitable for obtaining a block copolymer whose blocks have the characteristics of the invention. According to this process, if all the successive polymerization steps are carried out in the same reactor, it is generally preferable for all the monomers used during one step to have been consumed before the polymerization of the next step starts, therefore before the new monomers have been introduced. However, it may happen that the hydrophobic or hydrophilic monomers of the previous step are still present in the reactor during the polymerization of the next block. In this case, these monomers generally represent no more than 5 mol % of all the monomers and they participate in the following polymerization by contributing to introducing hydrophobic or hydrophilic units into the next block.

For more details with regard to the above polymerization processes, the reader may refer to the contents of Application WO 98/58974.

The hydrolysis may be carried out using a base or an acid. The base may be chosen from alkali or alkaline-earth metal hydroxides, such as sodium hydroxide or potassium hydroxide, alkali metal alcoholates, such as sodium methylate, sodium ethylate, potassium methylate, potassium ethylate and potassium tert-butylate, ammonia and amines such as triethylamines. The acids may be chosen from sulphuric acid, hydrochloric acid and paratoluenesulphonic acid. It is also possible to use an ion-exchange resin or an ion-exchange membrane of the cationic or anionic type. The hydrolysis is generally carried out a temperature of between 5 and 100° C., preferably between 15 and 90° C.

After hydrolysis, the block copolymer can be washed, for example by dialysis against water, or using a solvent such as alcohol. It may also be precipitated by lowering the pH below 4.5.

The hydrolysis may be carried out on a monoblock polymer, which will then be linked to other blocks, or on the final block copolymer.

The invention also relates to a process for controlling the hydrophilic/hydrophobic balance of amphiphilic block copolymers having at least one block coming from the polymerization of hydrophilic monomers and at least one block coming from the polymerization of hydrophobic monomers, in which:

hydrophilic units are introduced into the block coming from the polymerization of hydrophobic monomers, and/or hydrophobic units are introduced into the block coming from the polymerization of hydrophilic monomers.

Finally, the invention relates to the use of the above block copolymers as a gelling agent or as a thickening agent in aqueous and organic media. Preferably, the polymers have to be used in a concentration of at least 0.1% by weight and of at most 20%, even more preferably 0.5 to 10% by weight in said aqueous and organic media. The block copolymers according to the invention therefore have the advantage of allowing gelling in liquid media by being used in very low concentration. Consequently, the cost of using them is lower and they have little or no influence on the properties of the gelled medium.

The following examples illustrate the invention without however limiting its scope.

EXAMPLES

In the examples which follow:

$M_n$ represents the number-average molecular mass of the polymers, $M_n$ being expressed in polystyrene equivalents (g/mol), $M_w$ represents the weight-average molecular mass, $M_w/M_n$ represents the polydispersity index, the polymers, before hydrolysis, are analysed in GPC with THF as the elution solvent.

A—SYNTHESIS OF THE BLOCK COPOLYMERS (Examples 1 to 7)

For all the following examples, the polymerizations are carried out to a degree of conversion of the monomers of greater than 95%.

Example 1

Synthesis and hydrolysis of a poly(styrene/ methacrylic acid/2-hydroxyethyl methacrylate)-b- poly(ethylacrylate/methacrylic acid) diblock copolymer 1.1. Synthesis of a random styrene/methacrylic acid/2-hydroxyethyl methacrylate copolymer. Mass ratios: St/MAA/HEMA=90/5/5.

The polymerization was carried out in emulsion, in a jacketed reactor fitted with a stainless steel three-bladed stirrer. Introduced as a stock into the reactor, at room temperature, were 1178 g of water and 25.36 g of dodecyl sulphate (Texapon K12/96). The mixture obtained was stirred for 30 minutes (at 175 rpm) under nitrogen. The temperature was then raised to 85° C. and then 1.55 g of ammonium persulphate $(NH_4)_2S_2O_8$ in 2.48 g of water were incorporated.

At the same time, a mixture comprising:

248 g of styrene (St), 13.95 g of methacrylic acid (MAA), 13.95 g of 2-hydroxyethyl methacrylate (HEMA), and 7.44 g of methyl α—(O-ethylxanthyl)-propionate (CH$_3$CHCO$_2$Me) SCSOEt (composed of formula IA) started to be added.

The addition lasted 55 minutes. 15 minutes after starting to add the mixture comprising the monomers and the methyl α-(O-ethylxanthyl)propionate, 0.56 g of sodium carbonate Na$_2$CO$_3$ dissolved in 100 g of water started to be added. The latter addition took place over 45 minutes.

After the various ingredients had been completely added, an emulsion polymer (latex) was obtained which was maintained at 85° C. for one hour. After cooling to room temperature, 91 g of the polymer emulsion were removed for analysis.

The analysis results were as follows:

$M_n$=5900 g/mol $M_w/M_n$=2.2

1.2. Synthesis of the diblock copolymer

The synthesis started with the emulsion copolymer obtained above (section 1.1.). To this were added at 85° C., over one hour:

308 g of ethyl acrylate (EtA);

16 g of methacrylic acid (MAA); and 0.94 g of Na$_2$CO$_3$ diluted in 100 g of water.

The system was maintained at this temperature for a further two hours. Next, 1.46 g of t-butyl perbenzoate were added. Then the following were introduced over one hour (until the end of the reaction): 0.59 g of erythorbic acid diluted in 47 g of water.

After cooling to room temperature, the polymer obtained was analysed. The results of the analysis were as follows:

pH 4.6

$M_n$=13,300 g/mol $M_w/M_n$=1.75

1.3. Hydrolysis of the diblock copolymer

The hydrolysis was carried out in the reactor for synthesizing the block copolymer emulsion. Introduced into the reactor were:

200 g of the above copolymer (section 1.2.), expressed as dry matter (650 g of a 30.8 % solution);

1900 g of water (in order to adjust the solids content to 10% by weight at the end of hydrolysis).

Next, the pH was adjusted to a value of 8 using 1N sodium hydroxide. The temperature was raised to 90° C. and the reaction carried out under nitrogen.

With vigorous stirring (160 rpm), 528 g of 2N sodium hydroxide (corresponding to one molar equivalent of sodium hydroxide with respect to ethyl acrylate) were added over 1 hour. After all the sodium hydroxide had been added, the reaction was maintained under these conditions for 11 hours.

The degree of hydrolysis of the acrylate units was measured by proton NMR to be 88 mol%.

The product recovered at the end of the reaction was a translucent gel.

Example 2

Synthesis and hydrolysis of a poly(styrene/methacrylic acid)-b-poly(ethyl acrylate/methacrylic acid) diblock copolymer

2.1. Synthesis of a styrene/methacrylic acid random copolymer: St/MBA mass ratio =95/5

Introduced into the reactor as a stock, at room temperature, were 1112 g of water and 25.36 g of dodecyl sulphate (Texapon K12/96). The mixture obtained was stirred for 30 minutes (175 rpm) under nitrogen. The temperature was then raised to 85° C. and 1.55 g of ammonium persulphate (NH$_4$)$_2$S$_2$O$_8$ diluted in 2.48 g of water were then added.

At the same time, a mixture comprising:

248.04 g of styrene (St), 13.99 g of methacrylic acid (MAA), and 7.44 g of methyl α-(O-ethylxanthyl)propionate (CH$_3$CHCO$_2$Me) SCSOEt started to be added.

The addition was continued for 55 minutes. Fifteen minutes after the start of adding the mixture comprising the comonomers and the methyl α-(O-ethylxanthyl)propionate, the addition over 45 minutes of 0.56 g of sodium carbonate Na$_2$CO$_3$ dissolved in 100 g of water was started. After the various ingredients had been completely added, the copolymer emulsion obtained was maintained at 85° C. for one hour.

After cooling to room temperature, 89 g of the polymer emulsion obtained were removed for analysis.

The results were as follows:

$M_n$=6500 g/mol $M_w/M_n$=2.3

2.2. Synthesis of the diblock copolymer

The synthesis started with the emulsion copolymer obtained above (section 2.1.). To this were added at $_{85}$° C., over one hour:

308 g of ethyl acrylate (EtA);

16 g of methacrylic acid (MAA); and 0.94 g of Na$_2$CO$_3$ diluted in 100 g of water.

The system was maintained at this temperature for a further two hours. Next, 1.46 g of t-butyl perbenzoate were added. Then the following were introduced over one hour (until the end of the reaction): 0.59 g of erythorbic acid diluted in 47 g of water.

After cooling to room temperature, the diblock copolymer emulsion obtained was analysed. The results were as follows:

pH=5.6

$M_n$=13,900 g/mol $M_w/M_n$=1.7

2.3. Hydrolysis of the diblock copolymer

The above diblock copolymer (section 2.2.) was hydrolysed.

The operating method was the same as that in Example 1 (section 1.3.) (one molar equivalent of NaOH with respect to the ethyl acrylate units).

The degree of hydrolysis obtained was 84 mol%.

The product recovered at the end of the reaction was a translucent gel.

Example 3

Synthesis and hydrolysis of a poly(styrene/2-hydroxyethyl methacrylate)-b-poly(ethyl acrylate/methacrylic acid) diblock copolymer

3.1. Synthesis of a styrene/2-hydroxyethyl methacrylate random copolymer: St/HEMA mass ratio=95/5

The experimental protocol was the same as that described in Example 2 (section 2.1.) except that the methacrylic acid was replaced with an equal amount by weight of 2-hydroxyethyl methacrylate (HEMA). At the end of polymerization, an emulsion copolymer was obtained, 89 g of which were removed for analysis.

The analysis was as follows:

$M_n$=6400 g/mol $M_w/M_n$=2.2

3.2. Synthesis of the diblock copolymner

The synthesis started with the emulsion copolymer obtained above (section 3.1.). To this were added at 85° C., over one hour:

308 g of ethyl acrylate (EtA);

16 g of methacrylic acid (MAA); and 0.94 g of $Na_2CO_3$ diluted in 100 g of water.

The system was maintained at this temperature for a further two hours. Next, 1.46 g of t-butyl perbenzoate were added. Then the following were introduced over one hour (until the end of the reaction): 0.59 g of erythorbic acid diluted in 47 g of water.

After cooling to room temperature, the polymer obtained was analysed. The results were as follows:

pH=5.1

$M_n$=13,000 g/mol $M_w/M_n$=1.8

3.3. Hydrolysis of the diblock copolymer

The above diblock copolymer (section 3.2.) was hydrolysed.

The operating method was the same as that in Example 1 (section 1.3.) (one molar equivalent of NaOH with respect to the EtA units).

The degree of hydrolysis obtained was 90 mol%.

Example 4

Synthesis and hydrolysis of a poly(styrene/methacrylic acid)-b-poly(ethyl acrylate/methacrylic acid) diblock copolymer

4.1. Synthesis of a styrene/methacrylic acid random copolymer: St/MAA mass ratio=90/10.

Introduced into the reactor as a stock, at room temperature, were 1178 g of water and 25.36 g of dodecyl sulphate (Texapon K12/96). The mixture obtained was stirred for 30 minutes (175 rpm) under nitrogen. Next, the temperature was raised to 83° C. and a mixture 1 was added, this comprising:

24.8 g of styrene (St);

2.72 g of methacrylic acid (MAA); and 7.42 g of xanthate ($CH_3CHCO_2Me$) SCSOEt.

The mixture was heated to 85° C. and then 1.55 g of ammonium persulphate $(NH_4)_2S_2O_8$ diluted in 2.48 g of water were introduced.

At the same time, the addition of a mixture 2 comprising:

223.24 g of styrene (St) and 24.88 g of methacrylic acid (MAA) was started.

The addition was continued for 55 minutes. Fifteen minutes after the comonomer mixture 2 had been added, the addition over 45 minutes of 0.56 g of sodium carbonate $Na_2CO_3$ dissolved in 100 g of water was started. After the various ingredients had been completely added, the copolymer emulsion obtained was maintained at 85° C. for one hour.

After cooling to room temperature, 91 g of the emulsion was removed for analysis.

The results of the analysis were as follows:

$M_n$=6300 g/mol $M_w/M_n$=2.1

4.2. Synthesis of the diblock copolymer

The synthesis started with the emulsion copolymer obtained above (section 4.1.). To this were added at 85° C., over one hour:

308 g of ethyl acrylate (EtA);

16 g of methacrylic acid (MAA); and 0.94 g of $Na_2CO_3$ diluted in 100 g of water.

The system was maintained at this temperature for a further two hours. Next, 1.46 g of t-butyl perbenzoate were added. Then the following were introduced over one hour (until the end of the reaction): 0.59 g of erythorbic acid diluted in 47 g of water.

After cooling to room temperature, the polymer obtained was analysed. The results were as follows:

$M_n$=13,700 g/mol $M_w/M_n$=1.8

4.3. Hydrolysis of the diblock copolymer

The operating method was the same as that in Example 1 (section 4.3.) (one molar equivalent of NaOH with respect to the EtA units).

The degree of hydrolysis obtained was 90 mol%.

The product recovered at the end of the reaction was a translucent gel.

Example 5

Synthesis and hydrolysis of a poly(styrene/methacrylic acid/2-hydroxyethyl methacrylate)-b-poly(ethyl acrylate/methacrylic acid) diblock copolymer This diblock copolymer was synthesized in the same manner as in Example 4.

The styrene/methacrylic acid/2-hydroxyethyl methacrylate random copolymer obtained had the following characteristics:

mass ratios: St/MAA/HEMA=80/10/10;

$M_n$=6900 g/mol;

$M_w/M_n$=2.3.

Starting from this copolymer, a diblock copolymer was synthesized by polymerizing an ethyl acrylate/methacrylic acid mixture having an EtA/MAA mass ratio of 95/5.

The diblock copolymer had the following characteristics:

pH=5.1;

$M_n$=13,800 g/mol;

$M_w/M_n$=1.7.

The diblock copolymer was partially hydrolysed to a degree corresponding to 83 mol%.

Example 6

Synthesis and hydrolysis of a poly(styrene/ethyl acrylate)-b-poly(ethyl acrylate/methacrylic acid) diblock copolymer This diblock copolymer was synthesized in the same way as in Example 4.

The styrene/ethyl acrylate random copolymer obtained had the following characteristics:

St/EtA mass ratio=80/20;
$M_n$=7400 g/mol;
$M_w/M_n$=2.2.

Starting from this copolymer, a diblock copolymer was synthesized by polymerizing an ethyl acrylate/methacrylic acid mixture having an EtA/MAA mass ratio of 95/5.

The diblock copolymer had the following characteristics:
pH=5.1;
$M_{n=14,200}$ g/mol;
$M_w/M_n$=1,9.

The diblock copolymer was partially hydrolysed to a degree corresponding to 90 mol%.

Example 7

Synthesis and hydrolysis of a styrene-b-poly(ethyl acrylate/methacrylic acid) diblock copolymer This diblock copolymer was synthesized in the same manner as in Example 4.

The styrene polymer obtained had the following characteristics:
$M_n$=2600 g/mol;
$M_w/M_n$=2.4.

Starting from this polymer, a diblock copolymer was synthesized by polymerizing an ethyl acrylate/methacrylic acid mixture having an EtA/MAA mass ratio of 95/5.

The diblock copolymer had the following characteristics:
pH=5.1;
$M_n$=17,700 g/mol;
$M_w/M_n$=2.7.

The diblock copolymer was partially hydrolysed to a degree corresponding to 87 mol%.

B—PROPERTIES OF THE BLOCK COPOLYMERS of Examples 1 to 7

Example 8

Diblock copolymers comprising a predominantly hydrophobic block and a water-soluble block The hydrolysed block copolymers of Examples 1 to 6 had:
a water-soluble block and
a predominantly hydrophobic block.

After hydrolysis, these polymers were washed by dialysis against water. Depending on the analytical test to which they were subjected, they were then:
either concentrated by freeze drying and then redispersed;
or diluted in millipore water so as to bring them to the desired concentration.

The pH was adjusted to 9.

Test for the presence of a viscoelastic gel

All these block copolymers form a translucent gel at low concentration in water. The critical weight concentration at which they form a gel in solution, called the "critical gelling concentration" is given in Table 1. This concentration is that for which the elastic modulus G' becomes greater than the viscous modulus (G"). The measurements are given in Table 1.

TABLE 1

| Example | Critical gelling concentration |
| --- | --- |
| 1 | 4% by weight |
| 2 | 4% by weight |
| 3 | 5% by weight |
| 4 | 2% by weight |
| 5 | 3% by weight |
| 6 | 4% by weight |

In the case of Examples 2, 4 and 5, the values of the elastic modulus (G') and the viscous modulus (G") were measured using a Rhéométrixe ARES rheometer under the following conditions:
frequencies between $10^{-2}$ and $10^2$ rad/s;
20% deformation,
5% concentration by weight (solid content) of polymer.

The measurements are given in Table 2.

TABLE 2

| Example | G' (Pa) | G" (Pa) |
| --- | --- | --- |
| 2 | 60 | 10 |
| 4 | 400 | 20 |
| 5 | 100 | 10 |

It may be seen that the elastic modulus is always greater than the viscous modulus. The strongest gel is that of Example 4 (highest elastic modulus) which also has the lowest critical gelling concentration.

Test for the presence of micelles

The block copolymers of Examples 1 to 5 were dissolved in water to a concentration of $10^{-2}$%.

• The size of the polystyrene-based hydrophobic core of the micelles was determined by low-angle neutron scattering, after diluting the polymers in heavy water ($D_2O$) to $10^{-2}$% and by applying the known conventional processing to the scattering spectra.

Thus, it was found that, for the examples below, the polystyrene hydrophobic core of the micelles was essentially spherical. In Table 3, the radii deduced from the so-called "Guinier" and "Porod" processing are indicated.

The aggregation number, which corresponds to the number of diblocks participating in one micelle, is calculated from the volume of the hydrophobic core of the micelles. It is given-in Table 3 below, calculated from the value of the "Guinier" radius.

TABLE 3

| Example | "Guinier" radius | "Porod" radius | Aggregation number |
| --- | --- | --- | --- |
| 2 | 10 nm | 14 nm | 190 |
| 4 | 8 nm | 11 nm | 100 |
| 5 | 6.5 nm | 9 nm | 50 |

• The value of the hydrophobic core radius and the spherical shape were confirmed in the case of Examples 2 and 4 by cryo-microscopy (transmission electron microscopy carried out on a frozen sample). Small spherical particles from 15 to 20 nm in diameter attributed to the polystyrene core were observed.

Test for the presence of associated micelles

• These solutions 1, 2, 4 and 5 were analysed by quasielastic light scattering using a Brookhaven scattering set-up (BI- 200SM goniometer and BI-900AT correlator) at an angle of 90° and by applying the processing using the so-called "Contin" apparatus. By measuring the autocorrelation spectrum, a "slow" scattering coefficient associated with the existence of large objects a few hundred nm in size was deduced. The size of the objects for a concentration of $10^{-2}$% is given in Table 4.

TABLE 4

| Example | Size of the objects |
|---------|---------------------|
| 1 | 185 nm |
| 2 | 175 nm |
| 4 | 320 nm |
| 5 | 100 nm |

Since the maximum theoretical size of a 15,000 mass diblock in solution is less than 100 nm, these large objects therefore result from the association of the diblocks among themselves in the form of micelles or from the association of micelles among themselves, probably by association of the hydrophobic units of the water-soluble blocks.

Example 9

Diblock polymers comprising a completely hydrophobic block and a water-soluble block Copolymer according to Example 7

This block copolymer dissolved in water formed a translucent gel at low concentration: the value of the critical gelling concentration was 3% by weight.

This copolymer was analysed using the following techniques:
- by neutron scattering, it was found that the spherical hydrophobic polystyrene core had a "Guinier" radius of 8.6 nm,
- the shape and the size were confirmed by an electron cryo-micrograph,
- the size of the object determined by quasielastic light scattering was 337 nm and its fractal dimension determined by static light scattering was 1.

We therefore obtained in the case of a very asymmetric diblock (17/83) with a completely hydrophobic block and a partially hydrophilic block the same type of property as with a partially hydrophilic/partially hydrophobic symmetric block (50/50) (Examples 1 to 6).

With a completely hydrophobic block, it is necessary to have a very asymmetric diblock (small hydrophobic block) in order to maintain the solubility and the gelling.

C. BLOCK COPOLYMER SYNTHESIS (examples 10 and 11)

Example 10

Synthesis and hydrolysis of a poly(styrene/methacrylic acid)-b-poly(ethyl acrylate/methacrylic acid) diblock copolymer 10.1. Synthesis of a styrene/methacrylic acid random copolymer St/MAA mass ratio: 98/2; theoretical mass: $M_n$=2000 g/mol.

Introduced into a reactor as a stock, at room temperature, were 682.5 g of water, 8.54 g of sodium dodecyl sulphate and 0.189 g of sodium carbonate $Na_2CO_3$. The mixture obtained was stirred for 30 minutes (190 rpm) under nitrogen. Next, the temperature was raised to 75° C. before adding a mixture 1 comprising:
- 5.19 g of styrene (St);
- 0.105 g of methacrylic acid (MAA); and
- 5.51 g of xanthate ($CH_3CHCO_2Me$)SCSOEt.

The mixture was heated to 85° C. and then 1.21 g of ammonium persulphate $(NH_4)_2S_2O_8$ were introduced.

At the same time, the addition of a mixture 2 comprising:
- 46.78 g of styrene (St) and
- 0.945 g of methacrylic acid (MAA) was started.

The addition was continued for 60 minutes. After complete addition of the various ingredients, the copolymer emulsion obtained was maintained at 85° C. for one hour.

10.2. Synthesis of the diblock copolymer

EtA/MAA mass ratio: 98/2; theoretical mass $M_n$=21,468 g/mol.

The synthesis started with the emulsion copolymer obtained above (section 10.1.), into which were introduced 0.576 g of ammonium persulphate $(NH_4)_2S_2O_8$ diluted in 10 g of water.

To this were added at 85° C., over one hour:
- 481.9 g of ethyl acrylate (EtA);
- 9.8 g of methacrylic acid (MAA); and
- 0.545 g of $Na_2CO_3$ diluted in 150 g of water.

The system was maintained at this temperature for a further three hours.

10.3. Hydrolysis of the diblock copolymer

Specimen 10.3.a: The above copolymer was hydrolysed. Introduced into the reactor were:
- 30 g of the above copolymer (section 10.2.) expressed as dry matter (40.2% of 74.6 g);
- 157.4 g of water (in order to adjust the solids content to 10% by weight at the end of hydrolysis).

The temperature was raised to 90° C. While stirring vigorously, 67.9 ml of 2N sodium hydroxide (corresponding to 0.51 molar equivalent of sodium hydroxide with respect to-ethyl acrylate) were added over 1 hour. After the sodium hydroxide had been completely added, the reaction was maintained under these conditions for 24 hours. The product recovered at the end of the reaction was a translucent gel. The hydrolysis rate determined by NMR is about 44%.

Specimen 10.3.b: The operating method was the same as that for Specimen 10.2. The amount of sodium hydroxide added corresponded to 0.66 molar equivalent of sodium hydroxide with respect to ethyl acrylate. The product recovered at the end of the reaction was a translucent gel. The hydrolysis rate, determined by NMR is about 61%.

Specimen 10.3.c: The operating method was the same as that for Specimen 10.2. The amount of sodium hydroxide added corresponded to 0.76 molar equivalent of sodium hydroxide with respect to ethyl acrylate. The product recovered at the end of the reaction was a translucent gel. The hydrolysis rate, determined by NMR is about 72%.

Specimen 10.3.d: The operating method was the same as that for Specimen 10.2. The amount of sodium hydroxide added corresponded to 0.9 molar equivalent of sodium hydroxide with respect to ethyl acrylate. The product recovered at the end of the reaction was a translucent gel. The hydrolysis rate, determined by NMR is about 79%.

Specimen 10.3.e : The operating method was the same as that for Specimen 10.2. The amount of sodium hydroxide added corresponded to 2 molar equivalents of sodium hydroxide with respect to ethyl acrylate. The product recovered at the end of the reaction was a translucent gel. The hydrolysis rate, determined by NMR is higher than 95% and lesser than 98%

Example 11

Synthesis and hydrolysis of a poly(styrene/methacrylic acid)-b-poly(ethyl acrylate/methacrylic acid)-b-poly(styrene/methacrylic acid) triblock copolymer of 2000-19468-500 theoretical mass

11.1. Synthesis of a styrene/methacrylic acid random copolymer. St/MAA mass ratio: 98/2

The experimental protocol was identical to that described in Example 10, section 10.1.

11.2. Synthesis of the diblock copolymer

EtA/MAA mass ratio: 98/2; theoretical mass $M_n$: 21,468 g/mol.

The experimental protocol was identical to that described in Example 10, section 10.2.

11.3. Synthesis of the triblock copolymer

PS/MAA mass ratio in the 3rd block: 98/2; theoretical mass $M_n$: 21,968 g/mol.

Starting with 968 g of the diblock copolymer obtained above (section 11.2), 0.032 g of sodium carbonate $Na_2CO_3$ diluted in 5 g of water and 0.2878 g of ammonium persulphate $(NH_4)_2S_2O_8$ diluted in 10 g of water were introduced.

Over one hour, the following were added at 85° C.:

9 g of styrene (St);

0.173 g of methacrylic acid (MAA).

The system was maintained at this temperature for a further one hour.

11.4. Hydrolysis of the triblock copolymer

The above copolymer was hydrolysed according to the protocol described for Specimen 10.3.a. The amount of sodium hydroxide added corresponded to 2 molar equivalents of sodium hydroxide with respect to ethyl acrylate. The product recovered at the end of the reaction was a translucent gel. The hydrolysis rate is higher than 95% and lesser than 98%.

D—PROPERTIES OF THE BLOCK COPOLYMERS (of examples 10 and 11)

Example 12

Diblock copolymers comprising a predominantly hydrophobic block and a water-soluble block.
Variation in the number of hydrophobic units in the water-soluble block.

After hydrolysis, the copolymers 10.3.*a*, 10.3.*b*, 10.3.*c* and 10.3.*d* were diluted in millipore water in order to bring them to the desired concentration. The copolymer 10.3.*e* was washed by dialysis against water and then diluted in millipore water in order to bring it to the desired concentration.

In the case of the copolymers 10.3.*a*, 10.3.*b*, 10.3.*c*, 10.3.*d* and 10.3.*e*, the values of the elastic modulus (G') and the viscous modulus (G") were measured using a Rhéométrix SR200 rheometer under the following conditions:

frequencies between $10^{-2}$ and $10^2$ rad/s, 5 or 10% deformation,

2% concentration by weight (solid content) of polymer.

The values obtained at a frequency of 1 rad/s are given in Table 5.

TABLE 5

| Example | G' (Pa) | G" (Pa) |
|---------|---------|---------|
| 10.3.a  | 11.9    | 4.4     |
| 10.3.b  | 16.8    | 5.0     |
| 10.3.c  | 9.1     | 4.1     |
| 10.3.d  | 1.8     | 1.2     |
| 10.3.e  | 0.65    | 0.40    |

From Table 5, it appears that the elastic modulus exhibits a maxima for a hydrolysis rate of about 60%.

Example 13 —Triblock copolymer comprising a predominantly hydrophobic block, a water-soluble block and a predominantly hydrophobic block.

After hydrolysis, the copolymer of Example 11.4 was washed by dialysis against water and then diluted in millipore water in order to bring it to the desired concentration. The values of the elastic modulus and the viscous modulus were determined using the same operating method as in Example 12. The values obtained at a frequency of 1 rad/s are given in Table 6.

TABLE 6

| Example | G' (Pa) | G" (Pa) |
|---------|---------|---------|
| 11.4    | 30.2    | 3.6     |
| 10.3.e  | 0.65    | 0.40    |

From table 6, it appears that using a triblock provides a substantial increase of the elastic modulus.

What is claimed is:

1. A viscoelastic gel, comprising water and a gelling amount of a block copolymer comprising at least one block water-soluble in nature and containing hydrophobic units and at least one block predominantly hydrophobic in nature, wherein the predominantly hydrophobic block has hydrophilic units in an amount of between 0 and less than 33% by weight, with respect to the total weight of the units of the hydrophobic block, said block copolymer being in solution in the water.

2. A viscoelastic gel according to claim 1, wherein the predominantly hydrophobic block has hydrophilic units in an amount of between 1 and less than 33% by weight, with respect to the total weight of the units of the hydrophobic block.

3. A viscoelastic gel according to claim 2 wherein the predominantly hydrophobic block has hydrophilic units in an amount of between 2 and 15%, with respect to the total weight of the units of the hydrophobic block.

4. A viscoelastic gel according to claim 1, wherein the block water-soluble in nature has hydrophobic units in an amount of less than 70% by weight, with respect to the total weight of the units of the water-soluble shock.

5. A viscoelastic gel according to claim 1, wherein the block water-soluble in nature has hydrophobic units in an amount of between 50 and 25%, with respect to the total weight of the units of the water-soluble block.

6. A viscoelastic gel according to claim 4, wherein the block water-soluble in nature has hydrophobic units in an amount of at least 1% by weight.

7. A viscoelastic gel according to claim 1, wherein the block predominantly hydrophobic in nature in a completely hydrophobic block.

8. A viscoelastic gel according to claim 1, wherein the mass ratio of the blocks predominantly hydrophilic in nature to the blocks predominantly hydrophobic in nature is between 95/5 and 20/80.

9. A viscoelastic gel according to claim 1, wherein the copolymer is at a concentration of between 0.1% and 10% by weight.

10. A viscoelastic gel according to claim 1, wherein at least one of the said blocks is a copolymer coming from the copolymerization of hydrophilic and hydrophobic monomers.

11. A viscoelastic gel according to claim 10, wherein the amounts of hydrophilic and hydrophobic units in each of the said blocks are controlled by the respective contents of hydrophilic monomers and of hydrophobic monomers upon polymerization of the blocks.

12. A viscoelastic gel according to claim 1, wherein at least one of the said blocks is a copolymer prepared:

from the polymerization of monomers that are optionally rendered hydrophilic by hydrolysis, and, optionally, of non-hydrolysable hydrophobic monomers and of hydrophilic monomers, and then from the hydrolysis of the polymer obtained.

13. A viscoelastic gel according to claim 12, wherein the amounts of hydrophilic and hydrophobic units in each of the said blocks are controlled by the amount of monomers that can be rendered hydrophilic by hydrolysis and by the degree of hydrolysis.

14. A viscoelastic gel according to claim 12, wherein the hydrophobic monomers are:

vinylaromatic monomers;

diolefins; or alkyl acrylates and methacrylates, the alkyl group of which contains from 1 to 10 carbon atoms.

15. A viscoelastic gel according to claim 13, wherein the hydrophilic monomers are:

ethylenically unsaturated carboxylic acids;

acrylamide,(N-methylacrylamide, N-isopropylacrylamide), methacrylamide, polyethylene glycol methacrylate, polyethylene glycol acrylate;

sodium 2-acrylamido-2-methylpropanesulphonate (SAMPS), sodium styrenesulphonate or sodium vinylsulphonate.

16. A viscoelastic gel according to claim 12, wherein the monomers that are optionally rendered hydrophilic by hydrolysis are:

methyl acrylate, ethyl acrylate, hydroxyethyl acrylate, hydroxyethyl methacrylate, tert-butyl acrylate;

vinyl acetate;

quaternized 2-dimethylaminoethyl methacrylate and acrylate;

acrylamide or methacrylamide.

17. A viscoelastic gel according to claim 1, being a diblock copolymer or a triblock copolymer having a block water-soluble in nature flanked by two blocks predominantly hydrophobic in nature.

18. A viscoelastic gel according to claim 1, wherein it is a diblock copolymer comprising a block water-soluble in nature and a block predominantly hydrophobic in nature, the block water-soluble in nature containing acrylic acid (AA) units and ethyl acrylate (EtA) units and the block predominantly hydrophobic in nature containing styrene (St) units and methacrylic acid (MAA) or hydroxyethyl methacrylate (HEMA) units.

19. A viscoelastic gel according to claim 18, wherein the block water-soluble in nature comes:

from the polymerization of methacrylic acid (MAA) and of ethyl acrylate (EtA) in an EtA/MAA weight ratio from 90/10 to 99/1, and then from the hydrolysis of the polymer obtained to a degree of at least 50 mol % up to 95 mol %.

20. A viscoelastic gel according to claim 13, wherein the block predominantly hydrophobic in nature comes from the polymerization of a monomer mixture containing at least 80% by weight styrene.

21. A viscoelastic gel according to claim 1, having a molecular mass of at most 100,000 g/mol.

22. A viscoelastic gel according to claim 8, wherein the mass ratio is between 90/10 and 40/60.

* * * * *